(12) United States Patent
Welker et al.

(10) Patent No.: US 7,599,249 B2
(45) Date of Patent: Oct. 6, 2009

(54) CABLE MOTION DETECTION

(75) Inventors: Kenneth E. Welker, Asker (NO); Nicolas Goujon, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 406 days.

(21) Appl. No.: 10/623,904

(22) Filed: Jul. 21, 2003

(65) Prior Publication Data
US 2005/0018537 A1    Jan. 27, 2005

(51) Int. Cl.
*G01V 1/38* (2006.01)

(52) U.S. Cl. .......................................... 367/19; 367/16
(58) Field of Classification Search .................. 367/13, 367/16, 19, 120; 174/101.5; 73/1.75
See application file for complete search history.

(56) References Cited

U.S. PATENT DOCUMENTS

| | | | | |
|---|---|---|---|---|
| 3,791,043 A | * | 2/1974 | Russell | 33/312 |
| 4,257,718 A | * | 3/1981 | Rosa et al. | 405/167 |
| 4,454,756 A | * | 6/1984 | Sharp et al. | 73/152.54 |
| 4,611,171 A | * | 9/1986 | Woods | 324/253 |
| 4,715,018 A | * | 12/1987 | Blair | 367/19 |
| 4,942,557 A | * | 7/1990 | Seriff | 367/15 |
| 5,267,014 A | * | 11/1993 | Prenninger | 356/139.03 |
| 5,428,902 A | * | 7/1995 | Cheah | 33/366.14 |
| 5,696,733 A | * | 12/1997 | Zinn et al. | 367/19 |
| 5,724,307 A | * | 3/1998 | Gaiser | 367/21 |
| 6,005,828 A | * | 12/1999 | Carroll et al. | 367/19 |
| 6,162,191 A | * | 12/2000 | Foxlin | 600/595 |
| 6,229,102 B1 | * | 5/2001 | Sato et al. | 178/19.01 |
| 6,353,577 B1 | * | 3/2002 | Orban et al. | 367/43 |
| 6,430,105 B1 | * | 8/2002 | Stephen | 367/15 |
| 6,691,038 B2 | * | 2/2004 | Zajac | 702/14 |
| 6,847,896 B1 | * | 1/2005 | Orban et al. | 702/14 |
| 2002/0126575 A1 | * | 9/2002 | Bittleston | 367/19 |
| 2003/0117893 A1 | * | 6/2003 | Bary | 367/16 |

OTHER PUBLICATIONS

Entralgo, Roger. "Limitations in Permanently Installed Multi-Component (4C) Ocean Bottom Cable (OB) Acquisition Systems in Deepwater." SRW Meeting, Boise, Idaho. 2000.*
Partridge and Zinn. "Positioning Ocean Bottom Seismic Cables." The Hydrographic Society of America, 1999.*
Analog Devies. ADLX202E, "Low-cost +-2g Dual-axis Accelerometer with Duty Cycle Output." Analog Devices, Inc., 2000.*
Weinberg, Harvey. "Dual Axis, Low g, Fully Integrated Accelerometers." Analog Dialouge, vol. 33, No. 1, Jan. 1999.*
"Low Cost ±1.5g Single/Dual Axis Accelerometer" Analog Devices Preliminary Technical Data ADXL103/203; REV. PrA.Mar. 28, 2003.

* cited by examiner

Primary Examiner—Jack W. Keith
Assistant Examiner—Scott A Hughes
(74) Attorney, Agent, or Firm—Ari O. Pramudji; Richard V. Wells; Jeffrey E. Griffin

(57) ABSTRACT

The present invention provides for cable motion detection. In one aspect of the instant invention, a method is provided for cable motion detection using orientation sensor. The method includes determining at least one initial inclination of at least one orientation sensor coupled to a seismic cable, determining at least one current inclination of the at least one orientation sensor, and determining whether the at least one seismic cable has moved from the at least one initial inclination and the at least one current inclination.

12 Claims, 4 Drawing Sheets

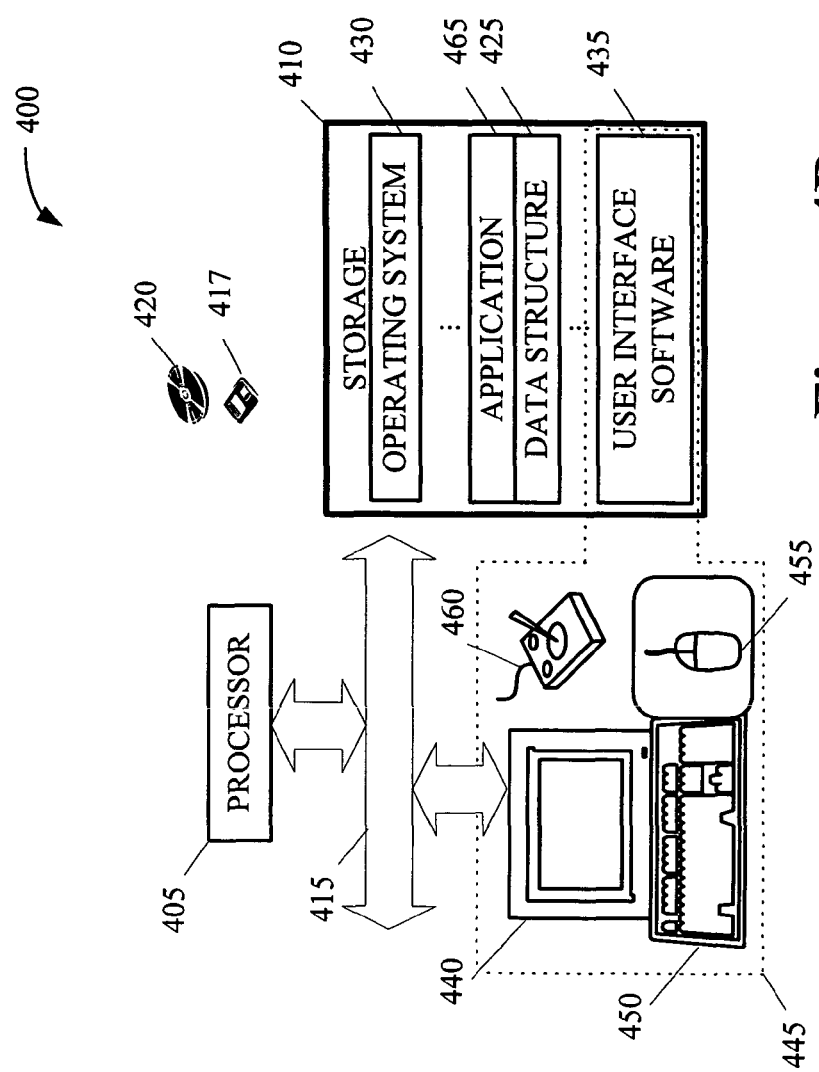
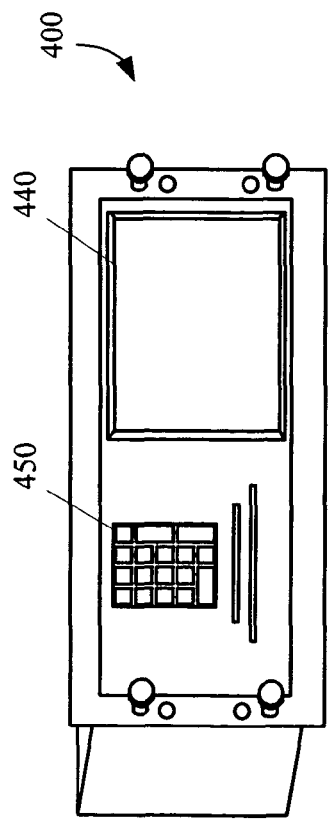
Figure 4B
Figure 4A

CABLE MOTION DETECTION

BACKGROUND OF THE INVENTION

1. Field of the Invention

This invention relates generally to ocean bottom or seabed seismic surveying, and, more particularly, to cable motion detection in ocean bottom or seabed seismic surveying.

2. Description of the Related Art

Underwater seismic exploration is widely used to locate and/or survey subterranean geological formations for hydrocarbon deposits. A survey typically involves deploying one or more and one or more seismic sensors at predetermined locations. For example, a seismic cable including an array of seismic sensors may be deployed on the sea floor and a seismic source may be towed along the ocean's surface by a survey vessel. The seismic sources generate acoustic waves that travel to the geological formations, where they are reflected and propagate back to the seismic sensors. The seismic sensors receive the reflected waves, which are then processed to generate seismic data. Analysis of the seismic data may indicate probable locations of geological formations and hydrocarbon deposits.

The accuracy of the seismic survey depends, at least in part, on an accurate determination of the location of the deployed cable during the survey, so the position of the deployed seismic cable is typically verified before conducting the seismic survey. For example, following the deployment of the cable, an initial position of the deployed cable is determined using an initial position determination operation. The initial position determination operation may be performed using a variety of well-known techniques. For example, one or more survey vessels may make direct measurements of the location of transceivers attached to the cable during passes along either side of the cable.

The deployed cable often moves during the seismic survey. For example, high currents and/or turbulence in the water may shift the position of the cable. If the seismic cable moves more than an acceptable distance from its initial position, it may be necessary to correct the seismic survey data, e.g., during subsequent data processing. Thus, despite the high cost of performing position determination operations, a final position of the cable may be verified using a final position determination operation after the seismic survey is complete. For example, the probability that the seismic cable has moved more than an acceptable distance from its initial position may be increased if the weather has been particularly bad during the course of the seismic survey, or the seas have been particularly high, and performing the final position determination operation may then be considered a worthwhile investment of time and resources.

However, the results of the initial and final position determination operations may incorrectly indicate that the cable has moved. For example, variations in the speed of sound in the water near the seismic cable may alter the propagation velocities of the acoustic waves used in the position determination operations, which may result in different determined positions of the seismic cable. For another example, these so-called "misclosures" between the initial and final position determinations may be caused by variations in the inclination angle between the survey vessel and the cable.

A variety of techniques are traditionally used to determine whether cable motion is the cause of the misclosures. In one conventional method, noise from the seismic sensors is monitored so that noise produced by motion of the seismic sensors may be detected. However, distinguishing motion-induced noise from other types of noise that may also be produced by the seismic sensor requires using complex logic devices that may not always accurately distinguish between the various types of noise. In another conventional method, the misclosures caused by acoustic propagation variations are modeled and compared to the measured misclosures. However, fitting the misclosures caused by acoustic propagation variations to an accurate model may be difficult, time-consuming, and frequently unsuccessful.

Moreover, even if it can be determined that the misclosures were caused by motion of the cable, it is very difficult, and often impossible, to determine when the movement of the cable occurred. Consequently, the location of the cable during the seismic survey may remain uncertain, which may reduce the accuracy of the results of the seismic survey.

SUMMARY OF THE INVENTION

In one aspect of the instant invention, a method is provided for cable motion detection. The method includes determining at least one initial inclination of at least one orientation sensor coupled to a seismic cable, determining at least one current inclination of the at least one orientation sensor, and determining whether the at least one seismic cable has moved from the at least one initial inclination and the at least one current inclination.

In one aspect of the present invention, a system is provided for cable motion detection. The system includes at least one seismic cable, at least one seismic sensor coupled to the at least one seismic cable, and at least one orientation sensor coupled to the at least one seismic cable. The system also includes a signal processing unit capable of determining at least one initial inclination of the at least one orientation sensor, determining at least one current inclination of the at least one orientation sensor, and determining whether the at least one seismic cable has moved using the at least one initial inclination and the at least one current inclination.

BRIEF DESCRIPTION OF THE DRAWINGS

The invention may be understood by reference to the following description taken in conjunction with the accompanying drawings, in which like reference numerals identify like elements, and in which:

FIG. 4 shows one embodiment of a rack-mounted computing apparatus that may perform the method illustrated in FIG. 3.

Figure 1:
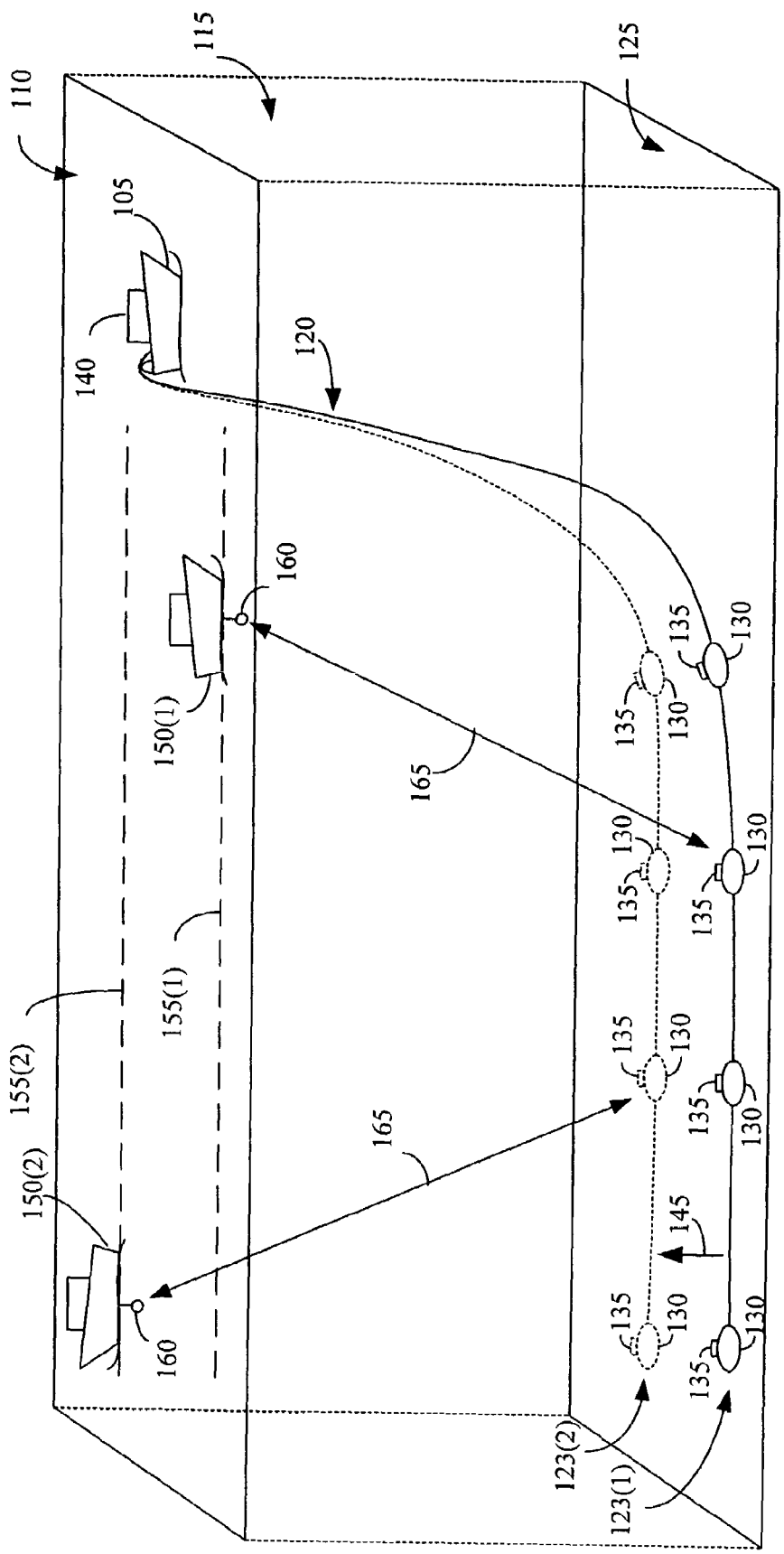
FIG. 1 shows an exemplary system for ocean bottom or seabed seismic surveying.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, an exemplary system 100 for ocean bottom and/or seabed seismic surveying is shown. The exemplary system 100 includes a seismic survey vessel 105 on the surface 110 of a body of water 115. In alternative embodiments, the body of water 115 may be freshwater, sea water, or brackish water. A seismic cable 120 is deployed from the seismic survey vessel 105. The seismic cable 120 is shown here in a first position 123(1) indicated by solid lines and a second position 123(2) indicated by dashed lines. Although only one seismic cable 120 is shown in FIGS. 1, the present invention is not so limited. In alternative embodiments, more seismic cables 120 may be deployed without departing from the scope of the present invention.

A plurality of seismic sensors 130 are coupled to the seismic cable 120 in conventional fashion. The seismic sensors 130 may receive a variety of acoustic signals including, but not limited to, direct acoustic signals from a seismic source (not shown), acoustic signals formed when the direct acoustic signals are reflected from geological formations below the floor 125 of the body of water 115, a reflected acoustic signal from the water/air interface, noise signals, and the like. For example, the seismic sensors 130 may be moving coil geophones. However, in alternative embodiments, the seismic sensors 130 may be any of a variety of types of sensors capable of measuring velocity and/or acceleration, such as geophones and the like. Furthermore, in other alternative embodiments, the seismic sensors 130 may be any of a variety of types of sensors capable of measuring pressure, such as hydrophones and the like.

The received acoustic signals are used to develop a representation of the geological formations below the floor 125 of the body of water 115, which may be used to identify hydrocarbon deposits in the geological formations. For one example, acoustic signals received by each of the plurality of seismic sensors 130 may be processed to form a representation of the geological formations below the floor 125. However, the manner in which the acoustic signals received by each of the plurality of seismic sensors 130 are processed to form the aforementioned representation is a matter of design choice and not material to the present invention.

The reflected acoustic signals include a pressure and an elastic wave field. The seismic sensors 130 may therefore measure four components of the acoustic signals: the pressure and three components of the elastic wave field, such as the components along an in-line direction, a cross-line direction, and a vertical direction. However, the present invention is not so limited. In alternative embodiments, any desirable combination of components of the reflected signal may be measured. For example, in one alternative embodiment, only components of the elastic wave field along a vertical direction may be measured.

During or subsequent to deployment, the plurality of seismic sensors 130 may come to rest at a variety of orientations and/or inclinations when deployed on the floor 125. Thus, in order to combine the signals received by the one or more seismic sensors 130, each seismic sensor housing 130 includes an inclinometer 135. In one embodiment, the inclinometer 135 measures the inclination of the associated seismic sensor 130 with respect to the gravitational field. For example, the inclinometer 135 may be a single and/or dual axis accelerometer formed on an integrated circuit chip, such as the ADXL 103/203 Single/Dual Axis Accelerometer produced by Analog Devices. However, in alternative embodiments any desirable type of orientation sensor, including inclinometers, tiltmeters, gyroscopic inclinometers, magnetic sensors or other device capable of measuring the orientation and/or inclination of the seismic sensor 130 may be used.

The illustrated embodiment depicts the inclinometers 135 as distinct from and on top of the seismic sensors 130. However, this is not necessary to the practice of the invention. In one alternative embodiment, the seismic sensors 130 may also perform the functions of the inclinometer 135, and so the inclinometer 135 may not be a separate device. For example, the seismic sensors 130 may be capable of measuring acceleration over a frequency band that extends down to DC so that the seismic sensors 130 may measure the DC component of the acceleration, i e. gravitational acceleration. In other alternative embodiments where inclinometer 135 is used for cable motion detection, the inclinometer 135 may not be coupled to the seismic sensor 130 and may be located anywhere along the seismic cable 120.

The seismic sensors 130 and/or the inclinometers 135 electronically communicate with a signal processing unit 140. The signal processing unit 140 in the system 100 may communicate with the seismic sensors 130 and/or the inclinometers 135 in any of a variety of manners well know to those of ordinary skill in the art having benefit of the present disclosure. These techniques include, but are not limited to, conductive wires and/or optical fibers located in the seismic cable 120, wireless electromagnetic transmissions, and the like. Although the signal processing unit 140 is depicted as a single unit deployed on the seismic survey vessel 105 in FIG. 1, the present invention is not so limited. In alternative embodiments, portions (not shown) of the signal processing unit 140 may be positioned on buoys (not shown), other survey vessels (not shown), on land, or any other desirable location without departing from the scope of the present invention.

As shown in FIG. 1, the seismic cable 120 may move from a first cable position 123(1) on the floor 125 of the body of water 115 to a second cable position 123(2). For example, currents in the body of water 115 may cause the seismic cable 120 to move along the direction indicated by the arrow 145. However, it will be appreciated by persons of ordinary skill in the art that the seismic cable 120 may not move while it is deployed on the floor 125 of the body of water 115. In that case, the first cable position 123(1) and the second cable position 123(2) may coincide. Note also that some portions of the seismic cable 120 may move while other portions do not.

The forces that may cause the seismic cable 120 to move, such as the currents in the body of water 115, are not predictable. Thus, it is conventional practice to perform an initial positioning operation before beginning an ocean bottom and/or seabed seismic survey and a final positioning operation after the end of the ocean bottom and/or seabed seismic survey. In one embodiment, the initial and final positioning operations are carried out by one or more survey vessels 150(1-2) traveling along one or more positioning lines 155(1-2). In various alternative embodiments, the one or more survey vessel 150(1-2) may travel along the one or more positioning lines 155(1-2) at different times or a plurality of vessels may travel along the one or more positioning lines 155(1-2) at the same time or at different times.

Each of the survey vessels 150(1-2) includes a distance detector 160 that may transmit and/or receive a positioning signal 165. The distance detector 160 typically determines a distance to the seismic cable 120 within an expected tolerance. For example, the distance detector 160 may be capable of determining the distance to the seismic cable 120 within about 1 meter. In one embodiment, the distance measurements are combined by a least squares algorithm to estimate the coordinates of the seismic sensors 130. However, persons of ordinary skill in the art will appreciate that the least squares algorithm is only one exemplary process that may be used to map acoustically derived distances and angles to coordinate estimates. In alternative embodiments, many formulas or computational methods, well known to those of ordinary skill in the art, may be used to map acoustically derived distances and angles to coordinate estimates.

Misclosures, in which the initial and final position coordinates 123(1-2) of the seismic cable 120 differ by more than the expected tolerance, are common. Thus, the signal processing unit 140 may be used to monitor signals provided by one or more of the inclinometers 135. In one embodiment, the signal processing unit 140 uses the signals provided by the inclinometers 135 to determine at least one initial inclination of the inclinometers 135, and thereby determine the inclination of the corresponding seismic sensor 130. For example, the signal processing unit 140 may determine the inclinations of the plurality of seismic sensors 130 after the seismic cable 120 has been deployed but before beginning an ocean bottom and/or seabed seismic survey operation. The signal processing unit 140 may then, at one or more selected times before, during, or after the ocean bottom and/or seabed seismic survey operation, determine a current inclination of one or more of the inclinometers 135. By comparing the initial and current inclinations, the signal processing unit 140 may determine whether the seismic cable 120 has moved.

Figure 2A:
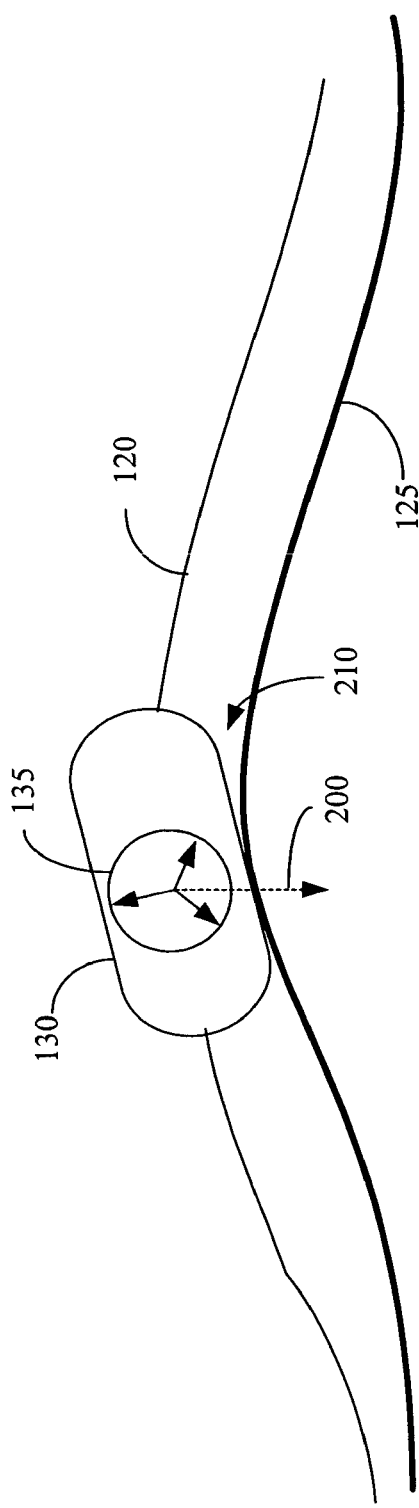
FIGS. 2A and 2B conceptually illustrate an inclination of a seismic sensor before and after motion of a seismic cable, such the seismic cable shown in FIG. 1.
Figure 2B:
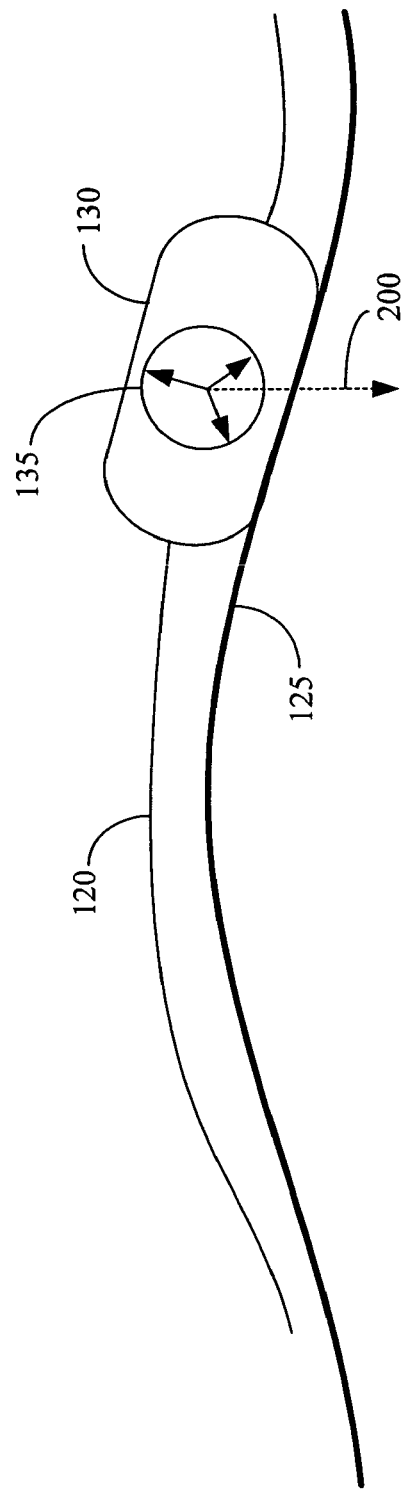

FIGS. 2A and 2B conceptually illustrate the inclination of the seismic sensor 130 before and after motion of the seismic cable 120. In the illustrated embodiment, movement of the seismic sensor 130 over the uneven floor 125 causes the orientation and/or inclination of the seismic sensor 130 to change. For example, various forces may cause the seismic sensor 130 to rotate on the uneven floor 125. The inclinometer 135 determines the change in the orientation and/or inclination of the seismic sensor 130.

In one embodiment, the seismic coupling of the seismic sensor 130 to the floor 125 may change as a result of motion of the seismic cable 120. For example, as illustrated in FIG. 2A, a gap 210 may exist between the seismic sensor 130 and the floor 125. The gap 210 may be closed when the seismic sensor 130 moves, as illustrated in FIG. 2B, which may change the seismic coupling of the seismic sensor 130 to floor 125. However, as will be appreciated by persons of ordinary skill in the art, the above example is merely intended to be illustrative of one of many possible situations in which the seismic coupling of the seismic sensor 130 to the floor 125 may change. Thus, this example is not intended to limit the present invention.

The inclinometer 135 provides one or more signals, which may be used to determine the orientation and/or inclination of the inclinometer 135. In one embodiment, the inclinometer 135 provides a DC signal when the inclinometer 135 is at rest, and an AC signal in response to a change in the orientation and/or inclination of the inclinometer 135. For example, when the inclinometer 135 is at rest, the inclinometer 135 provides an initial DC signal indicative of the orientation and/or inclination of the inclinometer 135 relative to the gravitational field 200. If the inclinometer 135 is moved, it may provide an AC signal in response to the motion. Once the moving inclinometer 135 comes to rest at a new orientation and/or inclination, the inclinometer 135 may provide a new DC signal indicative of the new orientation and/or inclination. The new DC signal is typically different than the initial DC signal, although in some unlikely instances it may be possible for the new DC signal and the initial DC signal to be the same.

Figure 3:
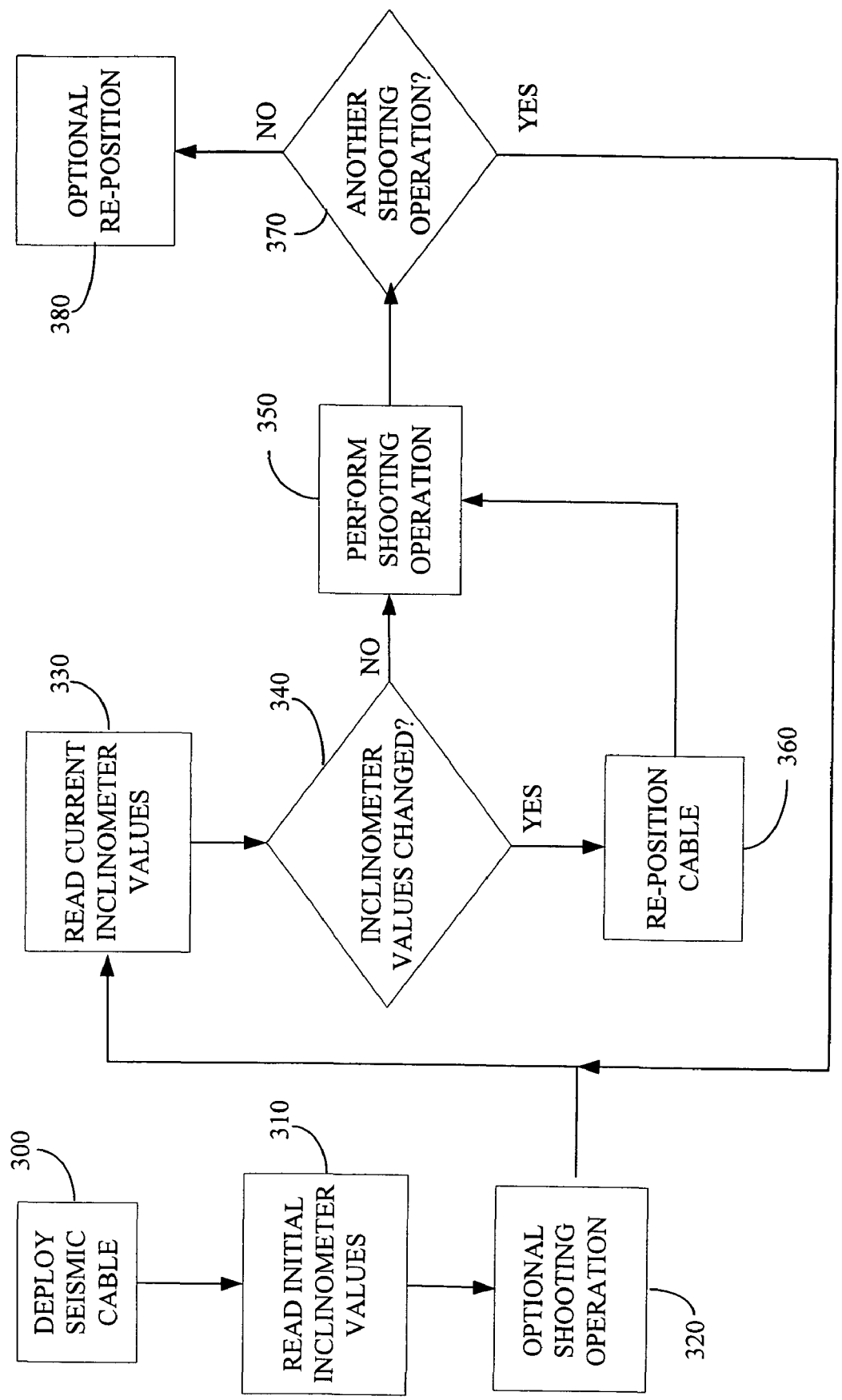
FIG. 3 illustrates one embodiment of a method for conducting an ocean bottom or sea-bed seismic survey including detecting motion of a seismic cable, such as the seismic cable shown in FIG. 2.

FIG. 3 illustrates one embodiment of the method for conducting an ocean bottom and/or seabed seismic survey including detecting motion of the seismic cable 120 using the inclinometers 135. The seismic cable 120 is deployed (at 300) and one or more initial inclinometer values are read (at 310). For example, the one or more initial inclinometer values may include one or more DC signals indicative of the orientation and/or inclination, relative to the gravitational field, of one inclinometer 135 in one seismic sensor 130. For another example, the initial inclinometer values may include DC signals indicative of the relative orientation and/or inclination of a plurality of inclinometers 135 in a corresponding plurality of seismic sensors 130.

An optional seismic shooting operation may be performed (at 320) after the initial inclinometer values are read (at 310). Seismic shooting operations are well-known to those of ordinary skill in the art and so, in the interest of clarity, particular embodiments of seismic shooting operations will not be described herein. Furthermore, performing (at 320) the optional shooting operation is not necessary for the practice of the present invention and may be omitted. For example, the seismic cable 120 may be buoyed-off because of inclement weather or large wave heights. During the time period between buoying-off the seismic cable and re-commencing the ocean bottom and/or seabed seismic survey, the inclement weather or large wave heights may increase the probability that the seismic cable 120 has moved. Thus, it may not be desirable to perform (at 320) the optional seismic shooting operation.

Current inclinometer values are read (at 330) and then compared to the initial inclinometer values to determine (at 340) whether the inclinometer values have changed. As discussed above, the initial and current inclinometer values may be indicative of the initial and current orientation and/or inclination of a single inclinometer 135 or of a plurality of inclinometers 135. In one embodiment, comparing the initial and current inclinometer values from a single inclinometer 135 may be sufficient to determine whether or not the seismic cable 120 has moved. However, in the unlikely event that the motion of the single inclinometer 135 results in the initial and current inclinometer values being the same, comparing the initial and current inclinometer values of a plurality of inclinometers 135 may be desirable to determine whether or not the seismic cable 120 has moved.

If it is determined (at 340) at the inclinometer values have not changed, indicating that the seismic cable 120 has not moved, a seismic shooting operation may be performed (at 350). If it is determined (at 340) that the inclinometer values have changed, indicating that the seismic cable 120 has moved, the seismic cable 120 is re-positioned (at 360). As will be appreciated by persons of ordinary skill in the art, re-positioning (at 360) the seismic cable 120 includes performing at least one position determination operation on the seismic cable 120, as discussed above. However, in alternative embodiments, re-positioning (at 360) the seismic cable 120 may also include physically moving the seismic cable 120 to a desired position, if the position determination operation shows that the seismic cable 120 has moved beyond an acceptable distance from the desired position. In that case, the seismic cable 120 may be moved to the desired position by, e.g., the survey vessel 140 shown in FIG. 1. After re-positioning (at 360) the seismic cable 120, a seismic shooting operation may be performed (at 350).

Furthermore, in one embodiment, re-positioning (at 360) the seismic cable 120 also includes re-calibrating the seismic coupling of the seismic sensors 130 to the floor 125. Although not necessary for the practice of the present invention, re-calibrating the seismic coupling may improve the accuracy of the ocean bottom and/or seabed seismic survey. Recalibrating the seismic coupling may be accomplished using techniques well-known in the art, and so, in the interest of clarity, these techniques will not be described herein.

If it is determined (at 370) that another shooting operation is to be performed (at 350), the current inclinometer values may be read (at 330). However, it is not necessary to read (at 330) the current inclinometer values before performing (at 350) each shooting operation. In alternative embodiments, a plurality of shooting operations may be performed (at 350) before reading (at 330) the current inclinometer values. For example, if the weather is mild and the sea is calm, it may not be desirable to read (at 330) the current inclinometer values before performing (at 350) each shooting operation because it may be unlikely that the seismic cable 120 has moved.

If it is determined (at 370) that no additional shooting operations are to be performed, an optional re-positioning of the seismic cable 120 may be performed (at 380). However, the optional re-positioning (at 380) of the seismic cable 120 is not necessary for the practice of the present invention and may be omitted. For example, it is determined (at 340) that the inclinometer values have not changed, or at least have not changed outside of a selected tolerance, indicating that the seismic cable 120 has not moved, the optional re-positioning (at 380) of the seismic cable may be omitted.

In the embodiment illustrated in FIG. 3, reading (at 330) the inclinometer values occurs at one or more selected times before, during, and/or after the ocean bottom and/or seabed seismic survey. However, in alternative embodiments, the inclinometer values may be monitored continuously before, during, and/or after the ocean bottom and/or seabed seismic survey. For example, the signal processing unit 140 shown in FIG. 1 may continuously monitor signals from the inclinometers 135. In one embodiment, the signal processing unit 140 may detect one or more AC signals provided by the inclinometers 135. The signal processing unit 140 may use the one or more AC signals, perhaps in combination with one or more DC signals indicative of one or more current and previous inclinations, to determine whether or not the seismic cable 120 is moving.

By determining whether the seismic cable 120 has moved using the above-described techniques, time periods between the detected movements of the seismic cable 120 may be mapped and the acoustic data recorded during these time periods grouped together. The grouped acoustic data may then be used to compute improved position estimates for the appropriate time periods. Furthermore, when operated in a continuous mode, movements of the seismic cable 120 may be detected in real-time, allowing extra position determination operations to be performed when necessary. Consequently, the positions of the seismic sensors 130 may be determined more accurately, which may result in improved quality of the representations of geological formations, including valuable hydrocarbon deposits, that may be produced using the seismic data acquired by the seismic sensors 130.

In one embodiment, the signal processing unit 140 shown in FIG. 1 includes a rack-mounted computing apparatus 400, illustrated in FIGS. 4A-B, which performs the aforementioned processes. The computing apparatus 400 includes a processor 405 communicating with some storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the data set acquired as discussed above, an operating system 430, user interface software 435, and an application 465. The user interface software 435, in conjunction with a display 440, implements a user interface 445. The user interface 445 may include peripheral I/O devices such as a key pad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    determining at least one initial value of a DC signal of at least one orientation sensor coupled to at least one ocean bottom cable;
    determining at least one current value of a DC signal of the at least one orientation sensor;
    comparing the at least one initial value of the DC signal of the at least one orientation sensor to the at least one current value of the DC signal of the at least one orientation sensor;
    determining whether the at least one ocean bottom cable has moved more than an acceptable distance from an initial position based on the comparison; and
    if it is determined that the at least one ocean bottom cable has moved more than the acceptable distance, then repositioning the at least one ocean bottom cable to a desired position.

2. The method of claim 1, wherein the ocean bottom cable comprises a plurality of orientation sensors coupled thereto, and wherein comparing the at least one initial-value of the DC signal and the at least one current value of the DC signal comprises comparing a plurality of initial-values of the DC signal and a plurality of current values of the DC signal of the plurality of orientation sensors.

3. The method of claim 1, wherein the at least one initial value and the at least one current value of the DC signal of the at least one orientation sensor are determined when the at least one orientation sensor is at rest.

4. The method of claim 1, further comprising determining an AC signal in response to a change in the orientation or inclination of the at least one orientation sensor.

5. The method of claim 4, wherein the AC signal indicates that the at least one orientation sensor has moved.

6. The method of claim 4, wherein determining whether the at least one ocean bottom cable has moved more than the acceptable distance comprises determining whether the at least one ocean bottom cable has moved more than the acceptable distance using the AC signal, the at least one initial value of the DC signal and the at least one current value of the DC signal.

7. The method of claim 1, further comprising:
    if it is determined that the at least one ocean bottom cable has not moved more than the acceptable distance, then performing a seismic shooting operation.

8. The method of claim 1, wherein the desired position is substantially the same as the initial position.

9. A system for carrying out a seismic survey, comprising:
    at least one ocean bottom cable;
    at least one seismic sensor coupled to the at least one ocean bottom cable;
    at least one orientation sensor coupled to the at least one ocean bottom cable; and
    a signal processing unit capable of:
        determining at least one initial value of a DC signal of the at least one orientation sensor;
        determining at least one current value of a DC signal of the at least one orientation sensor;
        comparing the at least one initial value of the DC signal of the at least one orientation sensor to the at least one current value of the DC signal of the at least one orientation sensor;
        determining an AC signal in response to a change in the orientation or inclination of the at least one orientation sensor; and
        determining whether the at least one ocean bottom cable has moved based on the comparison and the AC signal.

10. A system for carrying out a seismic survey, comprising:
    at least one ocean bottom cable;
    at least one seismic sensor coupled to the at least one ocean bottom cable;
    at least one orientation sensor coupled to the at least one ocean bottom cable, wherein the at least one orientation sensor is at least one of a single and a dual axis accelerometer formed on an integrated circuit chip; and
    a signal processing unit capable of:
        determining at least one initial inclination of the at least one orientation sensor;
        determining at least one current inclination of the at least one orientation sensor;
        determining whether the at least one ocean bottom cable has moved more than an acceptable distance using the at least one initial inclination and the at least one current inclination; and
        if it is determined that the at least one ocean bottom cable has not moved more than the acceptable distance, then performing a seismic shooting operation.

11. An article comprising one or more machine-readable storage media containing instructions that when executed enable a processor to:
    determine at least one initial value of a DC signal of at least one orientation sensor coupled to at least one ocean bottom cable when the at least one ocean bottom cable is at rest;
    determine an AC signal in response to a change in the orientation or inclination of the at least one ocean bottom cable;
    determine at least one current value of a DC signal of the at least one orientation sensor when the at least one ocean bottom cable is at rest;
    compare the at least one initial value of the DC signal of the at least one orientation sensor to the at least one current value of the DC signal of the at least one orientation sensor; and
    determine whether the at least one ocean bottom cable has moved based on the comparison and the AC signal.

12. An apparatus, comprising:
    means for determining at least one initial value of a DC signal of at least one orientation sensor coupled to at least one ocean bottom cable;
    means for determining at least one current value of a DC signal of the at least one orientation sensor;
    means for comparing the at least one initial value of the DC signal of the at least one orientation sensor to the at least one current value of the DC signal of the at least one orientation sensor;
    means for determining whether the at least one ocean bottom cable has moved based on the comparisons;
    means for repositioning the at least one ocean bottom cable to a desired position if it is determined that the at least one ocean bottom cable has moved; and
    means for performing a seismic shooting operation if it is determined that the at least one ocean bottom cable has not moved.

* * * * *